US011986801B1

(12) United States Patent
Khan

(10) Patent No.: US 11,986,801 B1
(45) Date of Patent: May 21, 2024

(54) SYNTHESIS OF A Au-(TiO$_{2-x}$/WO$_{3-x}$) SEMICONDUCTOR COMPOSITE USING FLUIDIZED BED CHEMICAL VAPOR DEPOSITION (FBCVD)

(71) Applicant: KING FAISAL UNIVERSITY, Al-Ahsa (SA)

(72) Inventor: Hayat Khan, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/438,788

(22) Filed: Feb. 12, 2024

(51) Int. Cl.
*B01J 23/30* (2006.01)
*B01D 53/00* (2006.01)
(Continued)

(52) U.S. Cl.
CPC ............ *B01J 23/30* (2013.01); *B01D 53/007* (2013.01); *B01D 53/8687* (2013.01);
(Continued)

(58) Field of Classification Search
CPC ... B01J 23/30; B01J 35/45; B01J 35/51; B01J 35/647; B01J 35/615; B01J 35/635;
(Continued)

(56) References Cited

U.S. PATENT DOCUMENTS 5,942,676 A * 8/1999 Potthast .................. G01N 27/12
  73/23.31
9,732,228 B2 8/2017 Argoitia
(Continued)

FOREIGN PATENT DOCUMENTS

CN 100522820 C 8/2009
CN 103272580 A 9/2013
(Continued)

OTHER PUBLICATIONS

V. Iliev et al., "Enhancement of photocatalytic oxidation of oxalic acid by gold modified WO3/TiO2 photocatalysts under UV and visible light irradiation." Journal of Molecular Catalysis A: Chemical 327, pp. 51-57. (Year: 2010).*

(Continued)

*Primary Examiner* — Patricia L. Hailey
(74) *Attorney, Agent, or Firm* — Nath, Goldberg & Meyer; Richard C. Litman

(57) ABSTRACT

A method of synthesizing an Au—(TiO$_{2-y}$/WO$_{3-x}$) semiconductor composite, the method comprising: loading tungsten oxide (WO$_3$) powder in a fluidized bed reactor followed by H$_2$ treatment to produce reduced tungsten oxide (WO$_3$) nanoparticles or WO$_{3-x}$ nanoparticles; producing reduced titanium dioxide (TiO$_2$) nanoparticles or TiO$_{2-y}$ (containing defect states) nanoparticles in-situ; coupling the TiO$_{2-y}$ nanoparticles with the WO$_{3-x}$ nanoparticles to provide a titanium dioxide/tungsten oxide nanocomposite (TiO$_{2-y}$/WO$_{3-x}$); and simultaneous substitutional doping of TiO$_{2-y}$ and WO$_{3-x}$ in the titanium dioxide/tungsten oxide nanocomposite (TiO$_{2-y}$/WO$_{3-x}$) with gold ions (Au) to obtain the Au—(TiO$_{2-y}$/WO$_{3-x}$) semiconductor composite; wherein x has a value between 0.33 and 0.37. The thus produced composite can be used as a photocatalyst.

16 Claims, 4 Drawing Sheets

(51) Int. Cl.
| | |
|---|---|
| *B01D 53/86* | (2006.01) |
| *B01J 23/52* | (2006.01) |
| *B01J 35/33* | (2024.01) |
| *B01J 35/39* | (2024.01) |
| *B01J 35/45* | (2024.01) |
| *B01J 35/51* | (2024.01) |
| *B01J 35/61* | (2024.01) |
| *B01J 35/63* | (2024.01) |
| *B01J 35/64* | (2024.01) |
| *B01J 37/00* | (2006.01) |
| *B01J 37/02* | (2006.01) |
| *B01J 37/18* | (2006.01) |

(52) U.S. Cl.
CPC .............. *B01J 23/52* (2013.01); *B01J 35/33* (2024.01); *B01J 35/39* (2024.01); *B01J 35/45* (2024.01); *B01J 35/51* (2024.01); *B01J 35/615* (2024.01); *B01J 35/635* (2024.01); *B01J 35/647* (2024.01); *B01J 37/0072* (2013.01); *B01J 37/0221* (2013.01); *B01J 37/18* (2013.01); *B01D 2255/106* (2013.01); *B01D 2255/20707* (2013.01); *B01D 2255/20776* (2013.01); *B01D 2255/9202* (2013.01); *B01D 2255/9205* (2013.01); *B01D 2255/9207* (2013.01); *B01D 2257/504* (2013.01); *B01D 2258/06* (2013.01)

(58) Field of Classification Search
CPC ... B01J 35/39; B01J 35/33; B01J 23/52; B01J 23/687; B01J 37/0072; B01J 37/0221; B01J 37/18; B01D 53/007; B01D 53/8687; B01D 2255/106; B01D 2255/20707; B01D 2255/20776; B01D 2255/9202; B01D 2255/9205; B01D 2255/9207; B01D 2257/504; B01D 2258/06
USPC ...... 204/157.3; 502/309, 317, 350; 438/104, 438/510; 252/514, 519.12, 520.21, 520.5
See application file for complete search history.

(56) References Cited

U.S. PATENT DOCUMENTS

| | | | |
|---|---|---|---|
| 2010/0210450 A1 | 8/2010 | Yadav | |
| 2013/0095998 A1* | 4/2013 | Hosogi | ............... B01J 37/033 502/309 |
| 2015/0031526 A1* | 1/2015 | Micallef | ............... B01J 21/063 502/61 |
| 2015/0071980 A1 | 3/2015 | Hobbs et al. | |
| 2018/0171149 A1 | 6/2018 | Raksha et al. | |
| 2019/0381490 A1* | 12/2019 | Wang | ...................... B01J 27/14 |

FOREIGN PATENT DOCUMENTS

| | | | | | |
|---|---|---|---|---|---|
| CN | 105537620 | A | * | 5/2016 | ............. B22F 9/24 |
| CN | 109453760 | A | * | 3/2019 | ............. B01J 23/30 |
| CN | 110947376 | A | * | 4/2020 | ......... B01D 53/8687 |
| CN | 111992202 | A | * | 11/2020 | ............. B01J 20/20 |
| JP | 2015051387 | A | * | 3/2015 | ............. B01D 53/86 |
| WO | 2007092030 | A2 | | 8/2007 | |

OTHER PUBLICATIONS

Muhammad Tahir et al., "Au-NPs embedded Z-scheme WO3/TiO2 nanocomposite for plasmon-assisted photocatalytic glycerol-water reforming towards enhanced H2 evolution." Applied Surface Science 503, pp. 1-12. (Year: 2020).*

Mohamad Mohsen Momeni et al., "Fabrication, characterization and photocatalytic properties of Au/TiO2-WO3 nanotubular composite synthesized by photo-assisted deposition and electrochemical anodizing methods." Journal of Molecular Catalysis A: Chemical 417, pp. 107-115. (Year: 2016).*

V. Iliev et al., "Photocatalytic properties of TiO2 modified with gold nanoparticles in the degradation of oxalic acid in aqueous solution." Applied Catalysis A: General 313, pp. 115-121. (Year: 2006).*

V. Iliev et al., "Influence of the size of gold nanoparticles deposited on TiO2 upon the photocatalytic destruction of oxalic acid." Journal of Molecular Catalysis A: Chemical 263, pp. 32-38. (Year: 2007).*

Székely, et al., "Tungsten Oxide Morphology-Dependent Au/TiO2/WO3 Heterostructures with Applications in Heterogenous Photocatalysis and Surface-Enhanced Raman Spectroscopy", Catalysts 2023, 13, 1015, pp. 1-33, First available online on Jun. 17, 2023.

Pudda, et al., "Novel one step hydrothermal synthesis of TiO2/WO3 nanocomposites with enhanced photocatalytic activity", Chemical communications (2007), pp. 4749-4751, First available online on Sep. 7, 2007.

* cited by examiner

SYNTHESIS OF A Au-($TiO_{2-x}$/$WO_{3-x}$) SEMICONDUCTOR COMPOSITE USING FLUIDIZED BED CHEMICAL VAPOR DEPOSITION (FBCVD)

BACKGROUND

1. Field

The present disclosure relates to synthesis of photocatalysts and, particularly, to in-situ synthesis of reduced titanium dioxide ($TiO_{2-y}$) photocatalysts containing defect states ($Ti^{+3}$ etc.).

2. Description of the Related Art

In recent years, transition metal oxide semiconductors have been studied extensively. Titanium dioxide ($TiO_2$) is an important semiconductor material and is generally a main component of paints, pigments, cosmetics, and foodstuffs. $TiO_2$ may be used in sterilization or disinfection, prevention of stains, medical (cancer treatment, catheter), gas sensors, self-cleaning windows, electron chromic devices, anti-reflection coatings for photovoltaic cells, energy conservation, catalytic oxidation of carbon monoxide and photodegradation of organic pollutants in water and air. Photocatalysis uses light to activate a catalytic material that breaks down pollutants. Photocatalysis has significant potential in environmental applications, but has not yet been successfully deployed on a commercial scale.

Common methods for preparing titanium dioxide include complex multistage processes with filtration, sintering, milling, and dispersion steps. These approaches may result in high production costs and significant waste of starting materials.

Thus, photocatalyst synthesis solving the aforementioned problems is desired.

SUMMARY

In an embodiment, the present subject matter relates to a method of synthesizing an Au—($TiO_{2-y}$/$WO_{3-x}$) semiconductor composite, comprising loading tungsten oxide ($WO_3$) powder in a fluidized bed reactor followed by $H_2$ treatment to produce reduced tungsten oxide ($WO_3$) nanoparticles or $WO_{3-x}$ nanoparticles; producing reduced titanium dioxide ($TiO_2$) nanoparticles or $TiO_{2-y}$ nanoparticles in-situ; coupling the $TiO_{2-y}$ nanoparticles with the $WO_{3-x}$ nanoparticles to provide a titanium dioxide/tungsten oxide nanocomposite ($TiO_{2-y}$/$WO_{3-x}$); and simultaneous substitutional doping of $TiO_{2-y}$ and $WO_{3-x}$ in the titanium dioxide/tungsten oxide nanocomposite ($TiO_{2-y}$/$WO_{3-x}$) with gold (Au) to obtain the Au—($TiO_{2-y}$/$WO_{3-x}$) semiconductor composite; wherein x has a value between 0.33 and 0.37 and $TiO_{2-y}$ has defect states ($Ti^{3+}$ etc.). That is to say, $TiO_{2-y}$ is equivalent to $TiO_2$ containing surface defects such as $Ti^{3+}$ or oxygen vacancies ($V_o$) or both, and is equivalent to "reduced $TiO_2$".

According to another embodiment, the present subject matter relates to a Au—($TiO_{2-y}$/$WO_{3-x}$) semiconductor composite prepared according to the methods described herein.

In an additional embodiment, the present subject matter relates to a photocatalyst comprising the Au—($TiO_{2-y}$/$WO_{3-x}$) semiconductor composite as described herein.

In a further embodiment, the present subject matter relates to a method of providing photocatalysis comprising exposing the photocatalyst as described herein to an environment conducive to photocatalysis.

These and other features of the present subject matter will become readily apparent upon further review of the following specification.

DETAILED DESCRIPTION OF THE PREFERRED EMBODIMENTS

Figure 1:
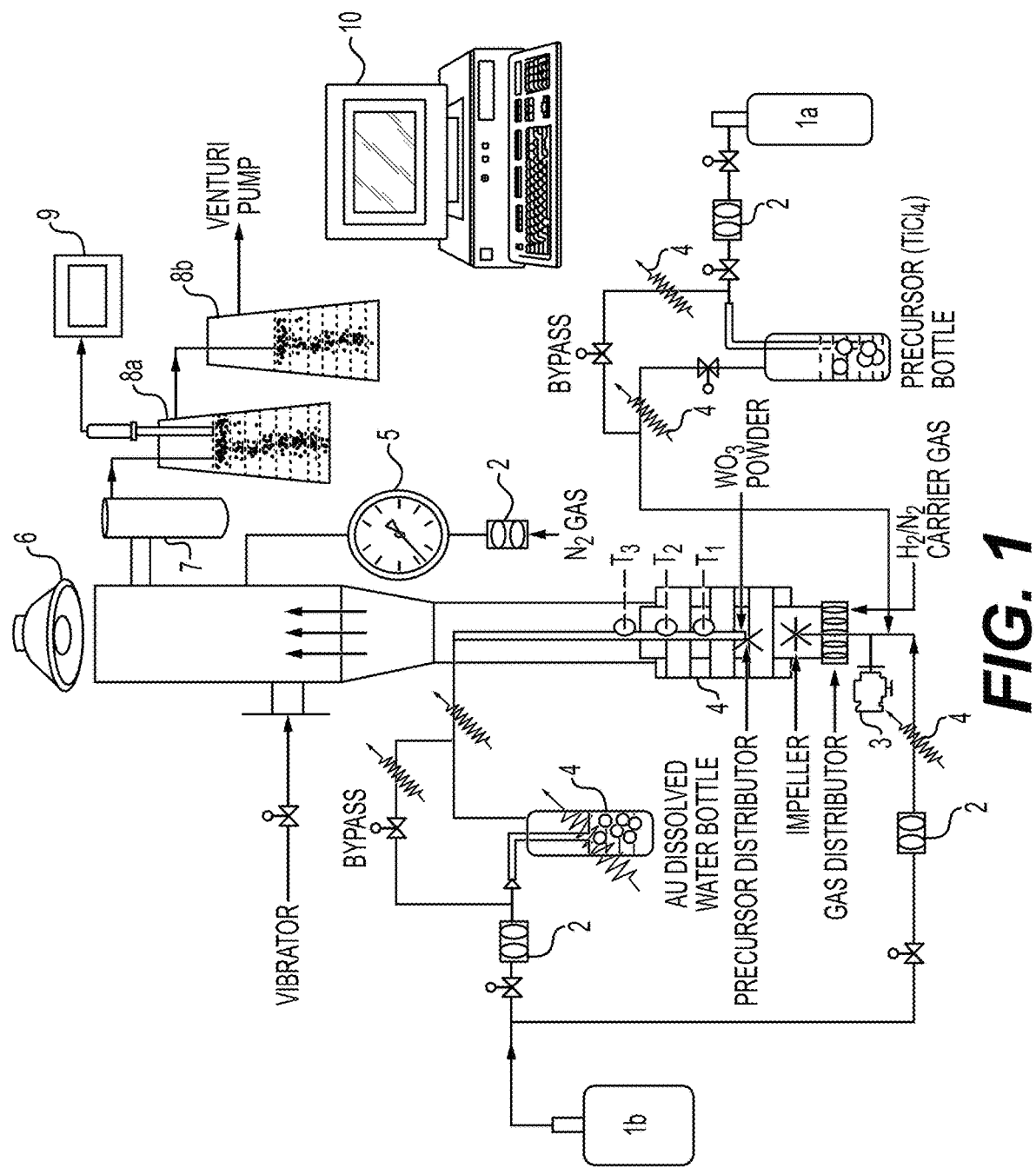
FIG. 1 is a schematic diagram of the fabrication system for producing an Au doped ($TiO_{2-y}$/$WO_{3-x}$) coupled semiconductor photocatalyst by a Fluidized Bed Chemical Vapor Deposition (FBCVD) process.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method of synthesizing an Au—($TiO_{2-y}$/$WO_{3-x}$) semiconductor composite, comprising loading tungsten oxide ($WO_3$) powder in a fluidized bed reactor followed by $H_2$ treatment to produce reduced tungsten oxide ($WO_3$) nanoparticles or $WO_{3-x}$ nanoparticles; producing reduced titanium dioxide ($TiO_2$), aka $TiO_{2-y}$ nanoparticles in-situ; coupling the $TiO_{2-y}$ nanoparticles with the $WO_{3-x}$ nanoparticles to provide a titanium dioxide/tungsten oxide nanocomposite ($TiO_{2-y}$/$WO_{3-x}$); and simultaneous substitutional doping of $TiO_{2-y}$ and $WO_{3-x}$ in the titanium dioxide/tungsten oxide nanocomposite ($TiO_{2-y}$/$WO_{3-x}$) with gold (Au) to obtain the Au—($TiO_{2-y}$/$WO_{3-x}$) semiconductor composite; wherein x has a value between 0.33 and 0.37 and $TiO_{2-y}$ has defect states.

Accordingly, the present subject matter relates to a two-stage process on a single site with the flexibility and ease to reduce $WO_3$ nanoparticles and then In-situ (i) produce of $TiO_{2-y}$ nanoparticles, (ii) couple $TiO_{2-y}$ with $WO_{3-x}$, and (iii) Au doped both the coupled semiconductors ($TiO_{2-y}$/$WO_{3-x}$).

The procedure described herein also has the advantage of producing a single step novel in-situ nano Au—($TiO_2$/$WO_3$) photocatalyst.

In an embodiment of the present production methods, the $H_2$ treatment can comprise inputting an airflow into the fluidized bed reactor comprising about 5% $H_2$ and about 95% $N_2$, by volume, at a flowrate of about 130 ml/min to about 140 ml/min, or about 135 ml/min. In certain embodiments in this regard, the $H_2$ treatment can be conducted at about 600° C.

In certain embodiments of the present production methods, the titanium dioxide nanoparticles can be produced by reacting a $TiCl_4$ reagent or Ti precursor with water.

In further embodiments of the present production methods, the gold ions can be doped into a crystal lattice of the $TiO_2$ nanoparticles. Further, the gold ions can be obtained by adding Tetrachloroaurate(III) trihydrate ($HAuCl_4·3H_2O$) dissolved in deionized water to the fluidized bed reactor.

In additional embodiments of the present production methods, a continuous supply of titanium precursor ($TiCl_4$), hydrogen, and Au water (Tetrachloroaurate(III) trihydrate ($HAuCl_4·3H_2O$) dissolved in deionized water) can be provided to the fluidized bed reactor. In this regard, the titanium precursor and Au water can be input into the fluidized bed reactor using a carrier nitrogen gas at a flowrate of about 65 ml/min to about 75 ml/min, or about 70 ml/min.

In certain embodiments, the $TiCl_4$ (titanium precursor) and Au water (Tetrachloroaurate(III) trihydrate ($HAuCl_4·3H_2O$) dissolved in deionized water) can be transported separately through bubbling the carrier gas of $N_2$ (purity >99.0 wt. %) into the fluidized bed reactor. The $TiCl_4$ reagent on reaction with water can produce $TiO_2$ with simultaneous doping of Au ions into its crystal lattice. Also, in situ Au is doped in the reduced $WO_{3-x}$ powder and gets coupled with Au-doped $TiO_{2-y}$ in the fluidized bed.

According to another embodiment, the present subject matter relates to an Au—($TiO_2$/$WO_3$) semiconductor composite prepared according to the methods described herein.

In certain embodiments in this regard, the Au—($TiO_{2-y}$/$WO_{3-x}$) semiconductor composite can have one or more of a BET surface area of about 250 to about 280 $m^2$/g, or about 260 $m^2$/g, an average pore diameter of about 3.5 to about 4 nm, or about 3.7 nm, and a total pore volume of about 0.55 to about 0.65 $cm^3$/g, or about 0.58 $cm^3$/g.

In further embodiments, the $TiO_{2-y}$ nanoparticles can have a spherical shape. In other embodiments, the $WO_{3-x}$ nanoparticles can have a needle shape. In certain embodiments in this regard, the $TiO_{2-y}$ nanoparticles and $WO_{3-x}$ nanoparticles can be uniformly distributed throughout the composite.

The reduced, coupled, and doped nano-photocatalyst with homogeneity and high surface area as described herein can have a lot of applications in environmental remediation, medical treatment (cancer treatment), energy conservation (fuel and solar cells and batteries), value added products ($CO_2$ conversion), and green hydrogen production (photolysis of water), etc.

In an additional embodiment, the present subject matter relates to a photocatalyst comprising the Au—($TiO_{2-y}$/$WO_{3-x}$) semiconductor composite as described herein.

In a further embodiment, the present subject matter relates to a method of providing photocatalysis comprising exposing the photocatalyst as described herein to an environment conducive to photocatalysis.

In certain embodiments in this regard, the photocatalysis can be provided by exposing the photocatalyst herein to an environment conducive to photocatalysis. Accordingly, the photocatalysis can be used to provide one or more of organic pollutant degradation, $CO_2$ greenhouse gas conversion, $H_2$ production by water photolysis, biodiesel production, energy conservation, and energy storage.

The present subject matter can be better understood by referring to the following examples.

EXAMPLES

Example 1

Preparation of Photocatalyst

Chemical vapor deposition was used to synthesize Au—($TiO_{2-y}$/$WO_{3-x}$) hybrid powders in a fluidized bed reactor, as schematically illustrated in FIG. 1. The fluidized bed reactor was made of quartz glass having dimensions of 35 mm diameter and 30 mm length and equipped with a porous stainless-steel disc of pore size 20 μm installed at the bottom and employed as the gas distributor. At the reactor outlet a porous stainless steel filter element with a 10 μm pore size was utilized to make sure that no powder particles make their way to the scrubber. High-purity nitrogen served as both a carrier gas and a fluidizing gas during the delivery of the precursor. Mass flow controllers (MKS Instruments, model 1179A) were used to regulate the flow rates. In order to detect the pressure drop across the powder bed and calculate the minimum fluidization velocity, pressure transducers (model Omega PX277) were positioned above the distributor plate and at the fluidization column's outlet.

The synthesis condition is shown in Table 1, below. Firstly, the $WO_3$ powders were prepared by crash precipitation method from the ammonium paratungstate $(NH_4)_{10}H_2(W_2O_7)_6)$ as tungsten precursor. 20 g of the $WO_3$ powder was charged into the reactor followed by supplying nitrogen to maintain a normalized pressure drop $\Delta P/\Delta P_o$ of unity for fluidization, the bed height was 0.55 ($H/H_o$). The $\Delta P/\Delta P_o$ is defined as the ratio of the pressure drop throughout the entire bed to the normal pressure brought about by the particle weight, represented by the equation $\Delta P_o = mg\, A^{-1}$, where A is the fluidized bed column's cross-sectional area and m is the weight of the particles in the bed. Secondly, continuous supply of titanium precursor ($TiCl_4$), hydrogen, and Au water (Tetrachloroaurate(III) trihydrate ($HAuCl_4 \cdot 3H_2O$) dissolved in deionized water) was made possible using the inert nitrogen as carrier gas to produce the In-situ Au—($TiO_{2-y}$/$WO_{3-x}$) hybrid nano powders.

TABLE 1

Synthesis condition of Au-($TiO_{2-y}$-$WO_{3-x}$) nanoparticles

| Sample | Bed temperature (° C.) | Carrier nitrogen ($N_2$) gas flow | | |
|---|---|---|---|---|
| | | $TiCl_4$ ml min$^{-1}$ | Au-$H_2O$ ml min$^{-1}$ | 5% $H_2$ ml min$^{-1}$ |
| Au-($TiO_2$-$WO_{3-x}$) | 600 | 70 | 70 | 135 |

The textural properties of the prepared Au—($TiO_{2-y}$/$WO_{3-x}$) powder by $N_2$ physisorption are shown in Table 2, below.

TABLE 2

Textural properties of the prepared Au-($TiO_{2-y}$/$WO_{3-x}$) powder by $N_2$ physisorption

| Sample | BET surface area (m$^2$ g$^{-1}$) | Pore diameter (nm) | Total pore volume (cm$^3$ g$^{-1}$) |
|---|---|---|---|
| Au-($TiO_{2-y}$/$WO_{3-x}$) | 260 | 3.7 | 0.58 |

In comparison to conventional techniques, including, for example, sol-gel, hydrothermal, chemical vapor deposition, precipitation, microwave, solvothermal, laser ablation etc., the proposed method produced a novel photocatalyst (Au—$TiO_{2-y}$/$WO_{3-x}$) with enhanced activity under light illumination as well in the dark (absence of light) due to its higher specific surface area and mesoporosity, excellent homogeneity, good contact between the two semiconductors and improved UV-Vis-NIR range light photons absorption and energy storage ability. The photocatalyst can be employed in organic pollutant degradation, $CO_2$ greenhouse conversion, $H_2$ production by water photolysis, biodiesel production and for energy conservation and storage etc.

Example 2

Characterization of Photocatalyst

Figure 2A:
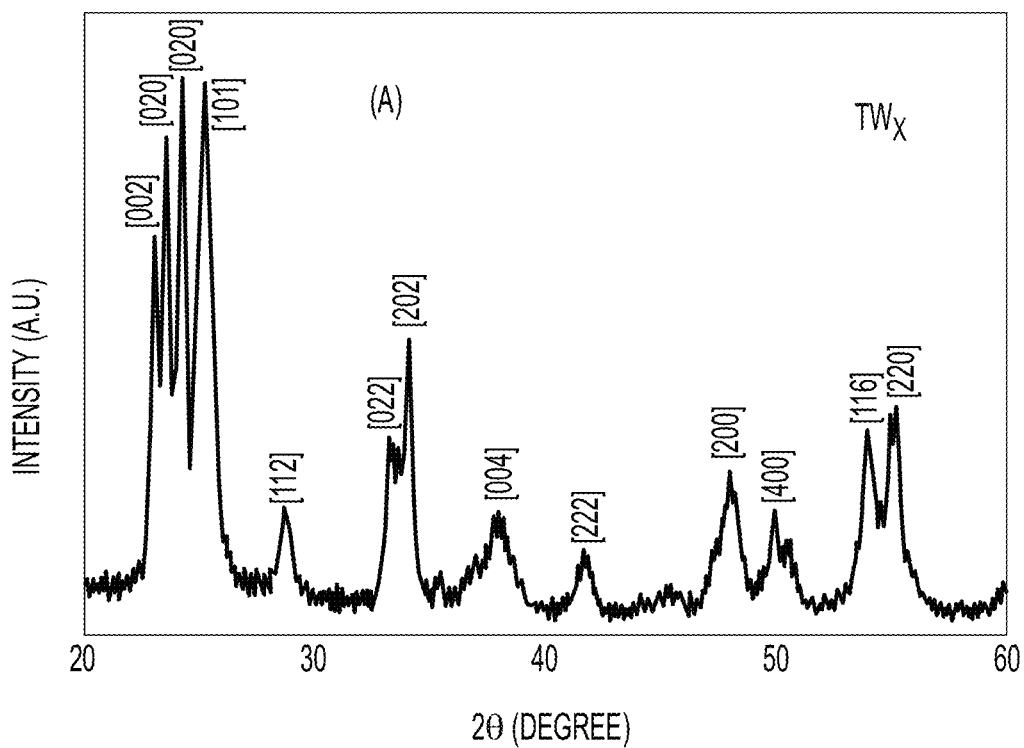
FIGS. 2A-2D show: XRD spectrum (2A), Raman spectrum (2C), SEM image (2C); and SEM-EDX elemental mapping of O, Ti, W and Au (2D) in the $TiO_{2-y}$—$WO_{3-x}$ hybrid powder.

FIG. 2A shows the X-ray diffractogram (XRD) of the prepared crystalline hybrid sample (Au—($TiO_{2-y}$/$WO_{3-x}$)) by Fluidized bed chemical vapor deposition method. The crystalline peaks observed for tetragonal anatase $TiO_{2-y}$ (ICDD ref. card no. 21-1272) at 2θ position were at 25.2° (101), 38.0° (004), 48.2° (200), 53.8° (116), and 55.1° (200), while for monoclinic $WO_{3-x}$(ICDD ref. card no. 43-1035) the peaks position at 2θ position were at 23.1° (002), 23.6° (020), 24.3° (020), 27.7° (112), 33.4° (022), 34° (202), 41.8° (222) and 49.9° (400). Moreover, no characteristic peak was observed for the dopant gold (Au), this might be due to its relatively very weak diffraction intensity or low content of gold.

Figure 2B:
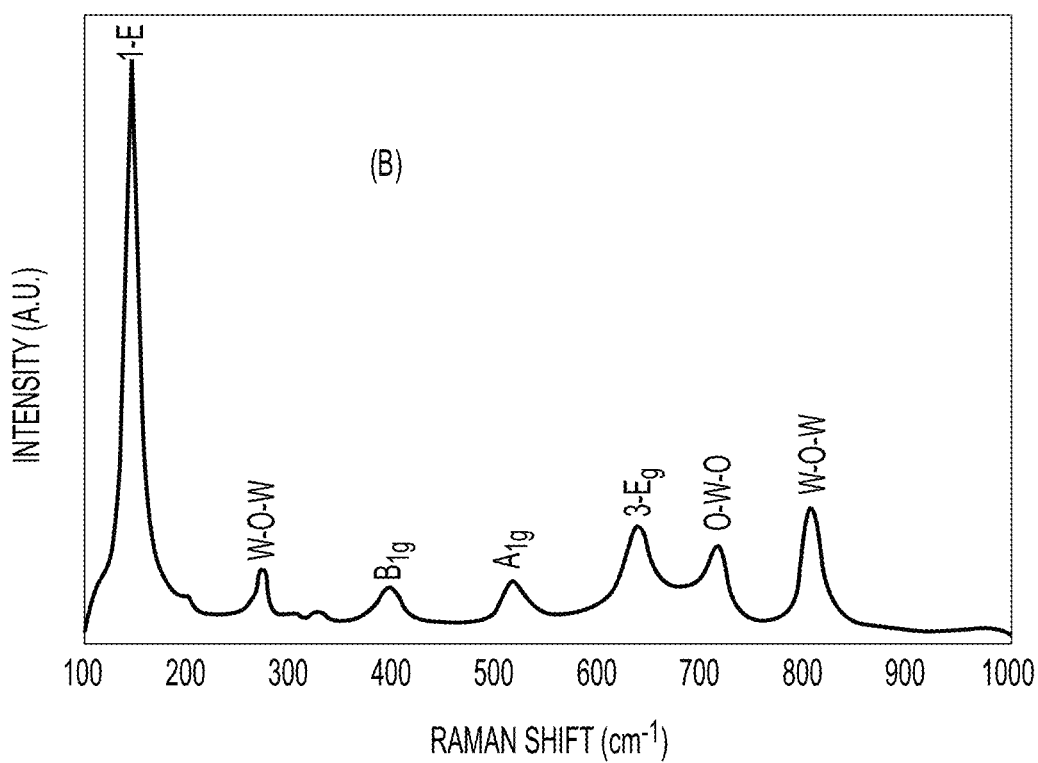

FIG. 2B shows the Raman spectrum of the synthesized powder. The peaks observed at 145.0 cm$^{-1}$ (1-$E_g$), 396.0 cm$^{-1}$ ($B_{1g}$), 520.0$^{cm-1}$ ($A_{1g}$) and 6421 cm$^{-1}$ (3-$E_g$) are typical of the tetragonal anatase $TiO_2$ structure, while for the monoclinic $WO_3$ the characteristic peaks were observed at 272.0 cm$^{-1}$ (W-O-W), 717.0 cm$^{-1}$ (O-W-O) and 807.1 cm$^{-1}$ (W-O-W).

Figure 2C:
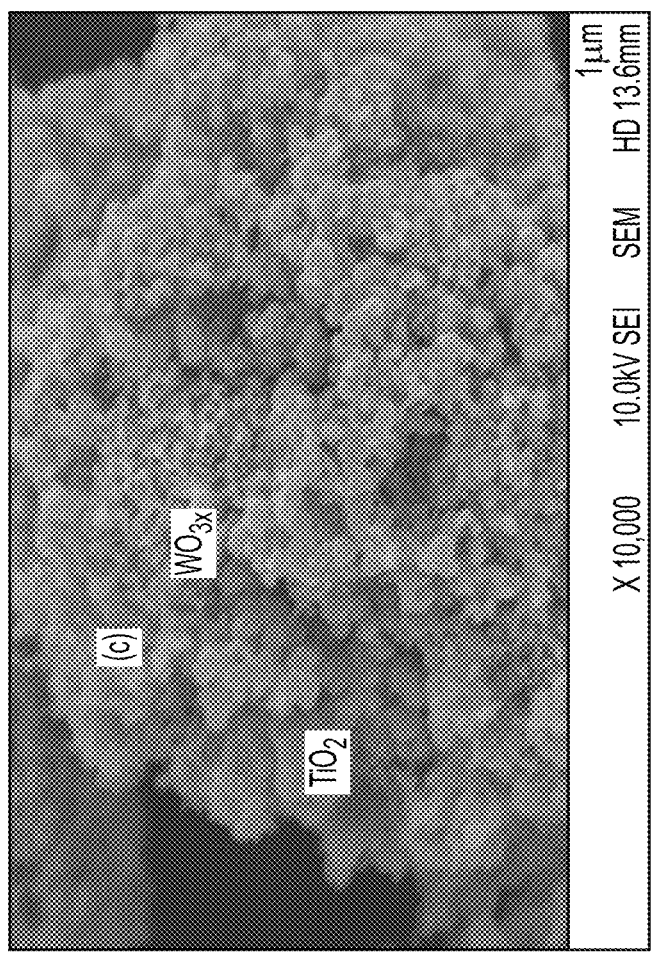
Figure 2D:
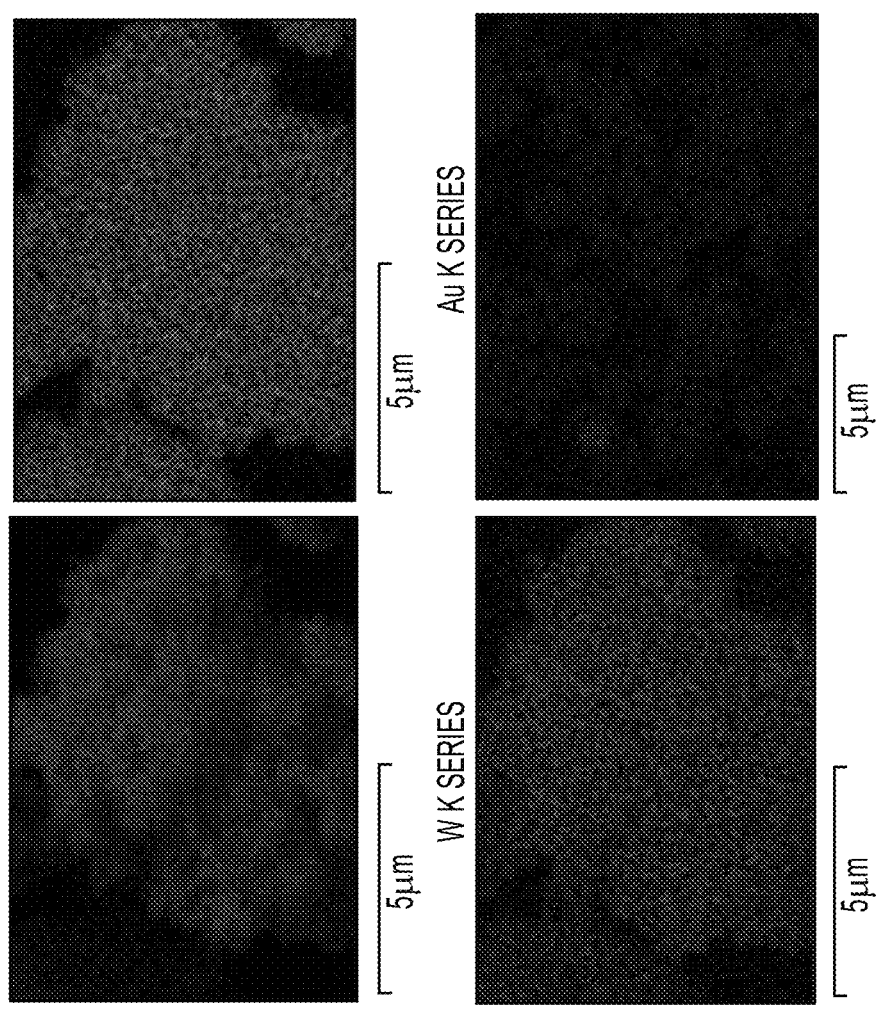

FIG. 2C portrays the field emission scanning electron microscope (FESEM) image of the prepared powder. The $TiO_{2-y}$ particles are in a spherical shape having a smooth surface, while the $WO_{3-x}$ particles exhibit a needle shape structure. In addition, both the semiconductors photocatalyst are uniformly distributed. The homogeneity is further confirmed by the SEM-EDX analysis, the elemental mapping is shown in FIG. 2D, which illustrates the even distribution of Ti (titanium) and W (tungsten) throughout the hybrid composite. This implies a high degree of contact between $TiO_2$ and $WO_{3-x}$ semiconductors photocatalyst.

It is to be understood that the present methods and products are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of synthesizing an Au—($TiO_{2-y}$/$WO_{3-x}$) semiconductor composite, the method comprising:
    loading tungsten oxide ($WO_3$) powder in a fluidized bed reactor followed by $H_2$ treatment to produce reduced tungsten oxide ($WO_3$) nanoparticles or $WO_{3-x}$ nanoparticles;
    producing titanium dioxide ($TiO_2$) nanoparticles or $TiO_{2-y}$ nanoparticles in-situ;
    coupling the $TiO_{2-y}$ nanoparticles with the $WO_{3-x}$ nanoparticles to provide a titanium dioxide/tungsten oxide nanocomposite (reduced $TiO_2$/$WO_{3-x}$); and
    simultaneous substitutional doping of $TiO_{2-y}$ and $WO_{3-x}$ in the titanium dioxide/tungsten oxide nanocomposite (reduced $TiO_2$/$WO_{3-x}$) with gold ions (Au) to obtain the Au—($TiO_{2-y}$/$WO_{3-x}$) semiconductor composite;
    wherein x has a value between 0.33 and 0.37.

2. The method of claim 1, wherein the $H_2$ treatment comprises inputting an airflow into the fluidized bed reactor comprising 5% $H_2$ and 95% $N_2$, by volume, at a flowrate of about 130 ml/min to about 140 ml/min.

3. The method of claim 2, wherein the $H_2$ treatment is conducted at about 600° C.

4. The method of claim 1, wherein the titanium dioxide nanoparticles are produced by reacting a $TiCl_4$ reagent with deionized water.

5. The method of 1, wherein the gold ions are doped into a crystal lattice of the $TiO_2$ nanoparticles.

6. The method of claim 1, wherein the gold ions are obtained by adding Tetrachloroaurate(III) trihydrate ($HAuCl_4 \cdot 3H_2O$) dissolved in deionized water to the fluidized bed reactor.

7. The method of claim 1, wherein a continuous supply of titanium precursor ($TiCl_4$), hydrogen, and Au water (Tetrachloroaurate(III) trihydrate ($HAuCl_4 \cdot 3H_2O$) dissolved in deionized water) is provided to the fluidized bed reactor.

8. The method of claim 7, wherein the titanium precursor and Au water are input into the fluidized bed reactor using a carrier nitrogen gas at a flowrate of about 65 ml/min to about 75 ml/min.

9. An Au—($TiO_{2-y}$/$WO_{3-x}$) semiconductor composite prepared according to the method of claim 1.

10. The Au—($TiO_{2-y}$/$WO_{3-x}$) semiconductor composite of claim 9, wherein the Au—($TiO_{2-y}$/$WO_{3-x}$) semiconductor composite has one or more of a BET surface area of about 250 to about 280 $m^2$/g, an average pore diameter of about 3.5 to about 4 nm, and a total pore volume of about 0.55 to about 0.65 $cm^3$/g.

11. The Au—($TiO_{2-y}$/$WO_{3-x}$) semiconductor composite of claim 9, comprising $TiO_2$ nanoparticles having a spherical shape.

12. The Au—($TiO_{2-y}$/$WO_{3-x}$) semiconductor composite of claim 9, comprising $WO_{3-x}$ nanoparticles having a needle shape.

13. The Au—($TiO_{2-y}$/$WO_{3-x}$) semiconductor composite of claim 9, comprising reduced $TiO_2$ nanoparticles and $WO_{3-x}$ nanoparticles uniformly distributed throughout the composite.

14. A photocatalyst comprising the Au—($TiO_{2-y}$/$WO_{3-x}$) semiconductor composite of claim 9.

15. A method of providing photocatalysis comprising exposing the photocatalyst of claim 14 to an environment conducive to photocatalysis.

16. The method of claim 15, wherein the photocatalysis is used to provide one or more of organic pollutant degradation, $CO_2$ greenhouse gas conversion, $H_2$ production by water photolysis, biodiesel production, energy conservation, and energy storage.

* * * * *